United States Patent
Kasperek et al.

(10) Patent No.: US 8,794,364 B2
(45) Date of Patent: Aug. 5, 2014

(54) LOCKING CAP FOR A FLUID RESERVOIR

(71) Applicant: GM Global Technology Operations LLC, Detroit, MI (US)

(72) Inventors: Larry M Kasperek, Sterling Heights, MI (US); Scott Jesnig, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/685,814

(22) Filed: Nov. 27, 2012

(65) Prior Publication Data

US 2013/0333960 A1  Dec. 19, 2013

Related U.S. Application Data

(60) Provisional application No. 61/659,667, filed on Jun. 14, 2012.

(51) Int. Cl.
*B65D 39/08* (2006.01)
*B60K 11/02* (2006.01)

(52) U.S. Cl.
USPC .................. 180/68.4; 220/288; 220/260

(58) Field of Classification Search
USPC ........ 180/68.4, 68.6; 220/285, 284, 260, 302, 220/301, 293, 288, 203.04, 203.22, 210, 220/315, DIG. 32
See application file for complete search history.

(56) References Cited

U.S. PATENT DOCUMENTS

| 1,521,781 | A | * | 1/1925 | Mead | 220/288 |
| 1,908,593 | A | * | 5/1933 | Fortune | 70/165 |
| 4,872,584 | A | * | 10/1989 | Sakai | 220/201 |
| 5,570,804 | A | * | 11/1996 | Chang et al. | 220/316 |
| 5,873,475 | A | * | 2/1999 | Volpe | 215/207 |
| 6,073,792 | A | * | 6/2000 | Campbell et al. | 220/284 |
| 2013/0221007 | A1 | * | 8/2013 | Jung et al. | 220/288 |

FOREIGN PATENT DOCUMENTS

DE  10132661 A1  1/2003

* cited by examiner

*Primary Examiner* — John Walters
*Assistant Examiner* — Brian Swenson
(74) *Attorney, Agent, or Firm* — Quinn Law Group, PLLC

(57) ABSTRACT

A locking assembly includes a release mechanism and a cap. The release mechanism includes a pin. The cap threadingly engages with a fill neck and includes a barrel portion and an engagement portion. The engagement portion radially surrounds the barrel portion. The engagement portion presents engagement threads which threadingly engage with threads of the fill neck. The annular cover portion radially surrounds the engagement portion. The annular cover portion rotates relative to the annular engagement portion in a second rotational direction to cause rotation of the engagement portion in the second rotational direction such that the engagement threads remain threadingly engaged with the neck threads. The annular cover portion rotates in the second rotational direction and causes rotation of the engagement portion in the second rotational direction to threadingly disengage the engagement threads from the threads when the pin is attached to the locking cap.

18 Claims, 7 Drawing Sheets

LOCKING CAP FOR A FLUID RESERVOIR

CROSS-REFERENCE TO RELATED APPLICATIONS

This application claims the benefit of U.S. Provisional Application No. 61/659,667 filed on Jun. 14, 2012, which is hereby incorporated by reference in its entirety.

TECHNICAL FIELD

The present disclosure relates to a locking cap for a fluid reservoir.

BACKGROUND

Vehicle systems typically use a pump to circulate fluid to various system components in order to lubricate or regulate the temperature of those components. For instance, an internal combustion engine can generate a tremendous amount of heat during operation. Engine coolant is thus circulated in an engine cooling loop to remove any excess heat, some of which may be used to heat the passenger compartment.

Certain vehicle designs use an electric fraction motor, either alone or in conjunction with the engine, in order to propel the vehicle. The traction motor draws electricity from a rechargeable energy storage system (RESS). The fraction motor provides input torque to a transmission, and ultimately powers a set of drive wheels of the vehicle. In addition to the RESS, such vehicles may use various other high power electrical components, for instance a power inverter module and an onboard battery charger. The temperatures of these components, as with the engine in a conventional or hybrid electric vehicle, may be regulated via dedicated fluid cooling loops as noted above.

SUMMARY

A vehicle includes a body component, a rechargeable energy storage system (RESS), an electric fraction motor, a coolant reservoir, and a cap. The electric traction motor is electrically connected to the RESS. The electric traction motor is configured to provide an output torque for propelling the vehicle using electrical energy from the RESS. The coolant reservoir is configured to retain a fluid therein. The coolant reservoir includes a fill neck having threads. The coolant reservoir is in fluid communication with the RESS. The fill neck opens to the coolant reservoir. The cap is threadingly engageable with the fill neck of the coolant reservoir. The cap includes an annular barrel portion, an annular engagement portion, and an annular cover. The annular barrel portion is axially disposable in the fill neck of the coolant reservoir. The annular engagement portion radially surrounds the annular barrel portion. The annular engagement portion presents engagement threads which are threadingly engageable with the threads of the fill neck. The annular cover portion radially surrounds the annular engagement portion. The annular cover portion is configured to rotate in a first rotational direction and cause rotation of the engagement portion in the first rotational direction such that the engagement threads threadingly engage with the threads. The annular cover portion is configured to rotate relative to the annular engagement portion in a second rotational direction to cause rotation of the engagement portion in the second rotational direction such that the engagement threads remain threadingly engaged with the threads.

A locking assembly is for engaging and disengaging threads of a fill neck of a reservoir. The locking assembly includes a release mechanism and a cap. The release mechanism includes a pin. The cap is threadingly engageable with the fill neck of the coolant reservoir. The cap includes an annular barrel portion and an annular engagement portion. The cap is axially disposable in the fill neck of the coolant reservoir. The annular engagement portion radially surrounding the annular barrel portion. The annular engagement portion presents engagement threads which are threadingly engageable with the threads of the fill neck. The annular cover portion radially surrounds the annular engagement portion. The annular cover portion is configured to rotate in a first rotational direction and cause rotation of the engagement portion in the first rotational direction such that the engagement threads threadingly engage with the threads. The annular cover portion is configured to rotate relative to the annular engagement portion in a second rotational direction to cause rotation of the engagement portion in the second rotational direction such that the engagement threads remain threadingly engaged with the neck thread. The annular cover portion is configured to rotate in the second rotational direction and cause rotation of the engagement portion in the second rotational direction to threadingly disengage the engagement threads from the threads when the pin of the release mechanism is attached to the locking cap.

A method of disengaging a cap from a fill neck of a fluid reservoir. The method includes inserting a pin of a release mechanism into a cover portion of the cap. The cover portion and the pin are rotated relative to a barrel portion of the cap such that a flexible arm of the barrel portion engages the pin. The cover portion and the pin continue to rotate such that the cover portion, the pin, and the barrel portion rotate together, relative to the fill neck, to threadingly disengage the cap from the fill neck.

The above features and advantages and other features and advantages of the present invention will be readily apparent from the following detailed description of the preferred embodiments and best modes for carrying out the present invention when taken in connection with the accompanying drawings and appended claims.

DETAILED DESCRIPTION

Figure 1:
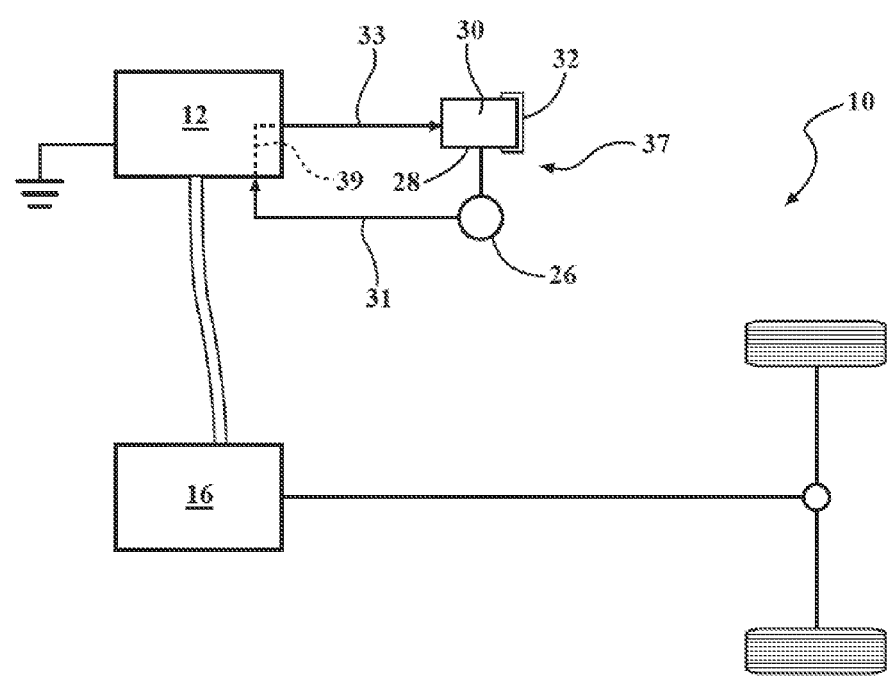
FIG. 1 is a schematic illustration of a vehicle having a battery cooling loop, access to which may be restricted via use of a device for a locking cap for a fluid fill reservoir.
Figure 2:
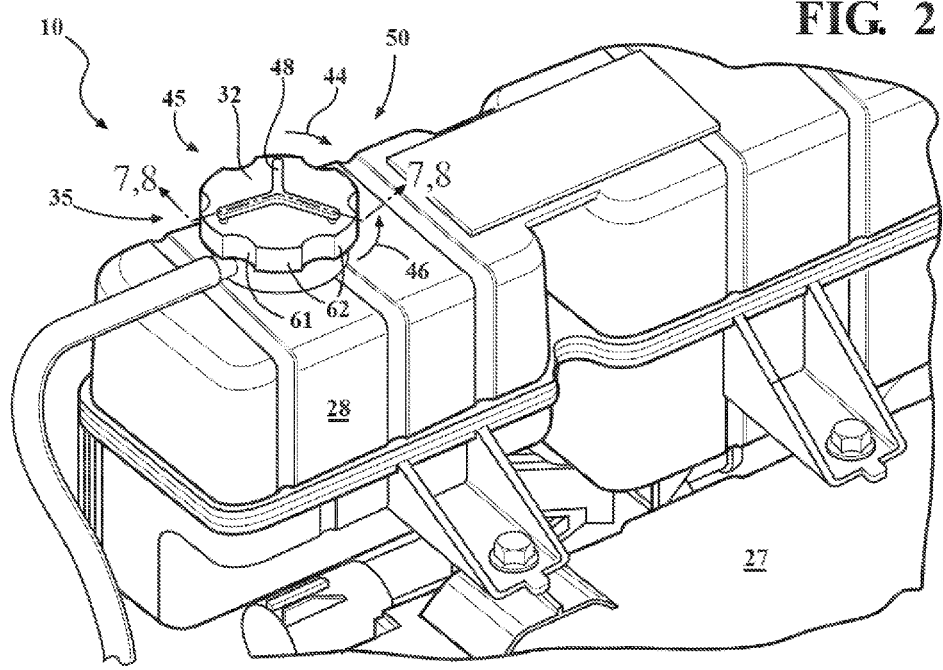
FIG. 2 is a schematic perspective view illustration of an example locking cap shown in an installed position with respect to an example coolant reservoir and also having a release mechanism attached thereto to facilitate removal of the locking cap from the installed position.
Figure 3:
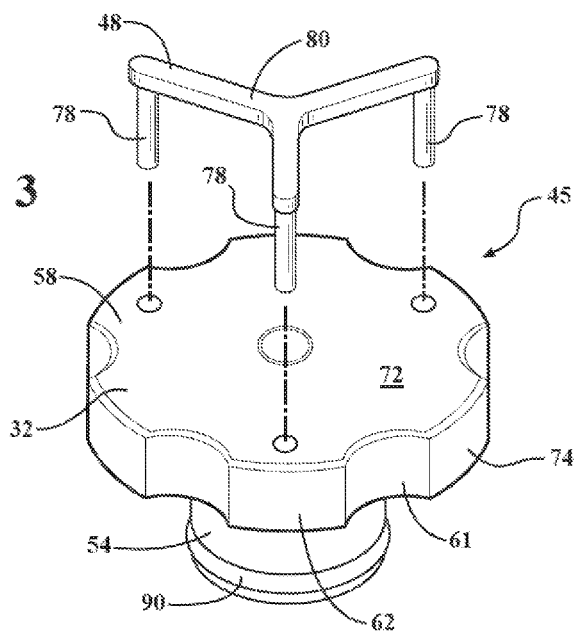
FIG. 3 is a schematic exploded perspective view of a locking assembly including the locking cap and the release mechanism.

Referring to the drawings, wherein like reference numbers refer to like components throughout the several views, a vehicle 10 is shown schematically in FIG. 1. The vehicle 10 includes a high-voltage rechargeable energy storage system (RESS) 12 and an electric traction motor 16. The RESS 12 is cooled and heated as needed via a battery cooling loop 37 having a coolant reservoir 28 that contains a liquid coolant 30, e.g., ethylene glycol/deionized water mixture. Access to the coolant reservoir 28 is restricted using a locking cap 32 as set forth hereinbelow with reference to FIGS. 2-4. In particular, an example battery coolant reservoir assembly 50 that uses such a locking cap 32 is shown in FIG. 2. An example locking cap 32 is shown in FIG. 3.

In any embodiment, i.e., hybrid, battery electric, or extended-range electric vehicle, substantial heat is generated over time by the operation of certain high-power electronic components, particularly the RESS 12, the traction motor 16, and the like, as well as any other required circuitry, onboard battery chargers, relays, and other support equipment. The RESS 12 in particular may be cooled or heated via the battery cooling loop 37 as noted above.

The battery cooling loop 37 of FIG. 1 may include an auxiliary, e.g., 12 volt, coolant pump 26 that circulates some of the liquid coolant 30 drawn from the coolant reservoir 28 to the RESS 12. Fluid circulation is indicated in FIG. 1 by arrow 31. The RESS 12 defines a plurality of internal fluid passages 39, only one of which is shown for illustrative simplicity, that collectively permit the liquid coolant 30 to freely flow between adjacent battery cells (not shown) of the RESS 12, e.g., individual foil lithium ion battery cells. In this manner, the battery cells comprising the RESS 12 can be liquid-cooled as needed. While not shown in FIG. 1, the battery cooling loop 37 may also include a heat exchanger, a 3-way flow control valve, a radiator, and other components necessary to selectively heat the liquid coolant 30 for warming the RESS 12, for instance on particularly cold days. Return flow (arrow 33) is provided back to the coolant reservoir 28.

Referring to FIG. 2, the coolant reservoir 28 and a locking cap 32 collectively form the battery coolant assembly 50. The coolant reservoir 28 may be affixed to the front of a body component 27, for instance an under hood component such as a cross member, beam, or support member.

The coolant reservoir 28 contains the liquid coolant 30 of FIG. 1. The reservoir 28 defines a fluid inlet 35. The fluid inlet 35 is securely closed using the locking cap 32. The locking cap 32 may have six axial side walls 61 and six lobes 62 as shown, although fewer or more lobes 62 and side walls 61 may be used in other embodiments. As will be described in more detail below, the locking cap 32 may be threaded female threads 42, with the fluid inlet 35 having mating male engagement threads 40 in the conventional manner such that the cap 32 may be readily tightened by clockwise rotation of the cap 32 in a first rotational direction.

However, it is recognized herein that improper filling of the coolant reservoir 28 may be problematic at times depending on the nature of the liquid coolant 30 and the design of the RESS 12, both of which are shown in FIG. 1. Therefore, it may be desirable to limit end-user access to the coolant reservoir 28. Because low coolant levels in the coolant reservoir 28 may indicate the presence of an internal fluid leak somewhere in the battery coolant loop 37 shown in FIG. 1, a locking assembly 45, including the locking cap 32 and a release mechanism 48, can be configured to be readily tightened by clockwise rotation, but may not be loosened by counterclockwise rotation, i.e., in a second rotational direction 46, unless the release mechanism 48 is applied to the locking cap 32. Requiring the release tool to facilitate removal of the cap 32 can help to ensure that the vehicle 10 of FIG. 1 is promptly taken to a maintenance facility for corrective action when coolant levels in the coolant reservoir 28 are low, rather than a user simply topping off coolant levels and delaying maintenance, potentially with the wrong coolant. The release mechanism 48 will be described in more detail below. Use of the locking cap 32 as part of the locking assembly 45 helps to achieve these ends by preventing rotation in the second rotational direction 46 to unscrew the cap, i.e., the counter clockwise direction, and thus removal of the locking cap 32 from the fluid inlet 35 as set forth below with reference to FIGS. 1, 2, and 5.

The coolant reservoir includes a fill neck 52, having threads, and is in fluid communication with the RESS. The fill neck 52 opens to the coolant reservoir. The locking cap 32, which is threadingly engageable with the fill neck 52 of the coolant reservoir, includes an annular barrel portion 54, an annular engagement portion 56, and an annular cover portion 58. The barrel portion 54 is axially disposable in the fill neck 52 of the coolant reservoir. The engagement portion 56 radially surrounds the annular barrel portion 54. The engagement portion 56 presents the engagement threads 40 which are threadingly engageable with the threads 42 of the fill neck 52. The cover portion 58 surrounds the annular engagement portion 56. The cover portion 58 is rotatable in the first rotational direction 44, causing a resultant rotation of the engagement portion 56 in the first rotational direction 44, such that the engagement threads 40 threadingly engage with the threads 42. The cover portion 58 is also configured to rotate relative to the annular engagement portion 56 in the 44 rotational direction 46, opposite the first rotational direction, to cause rotation of the engagement portion 56 in the second rotational direction 46 such that the engagement threads 40 remain threadingly engaged with the threads 42. Therefore, in the second rotational direction 46, only the cover portion 58 rotates in the second rotational direction 46, leaving the engagement portion 56 engaged with the threads 42 of the fill neck 52.

Figure 4:
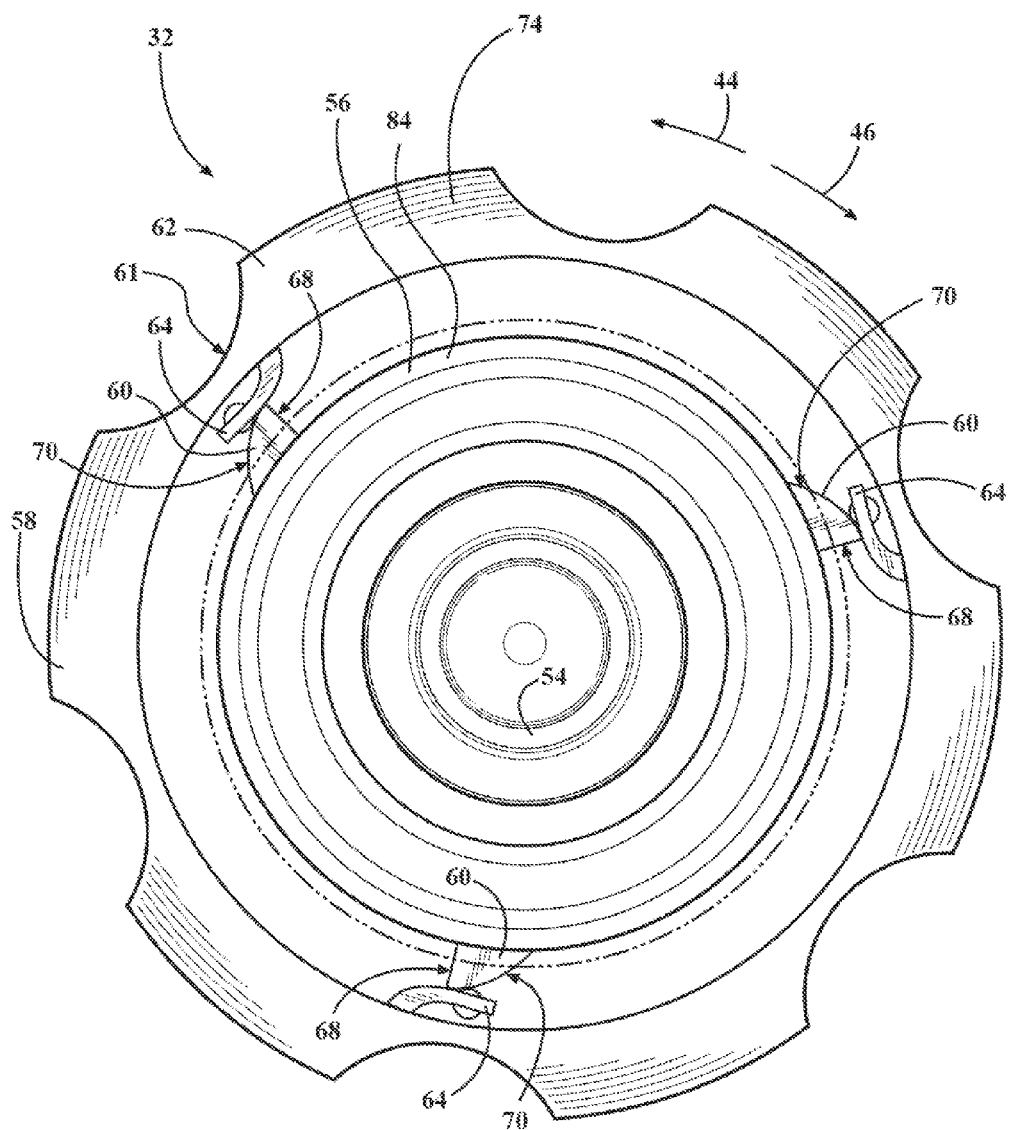
FIG. 4 is a schematic bottom view of the locking cap of FIG. 2 illustrating rotation in a second rotational direction of a cover portion, relative to an engagement portion, to prevent removal from the installed position.
Figure 5:
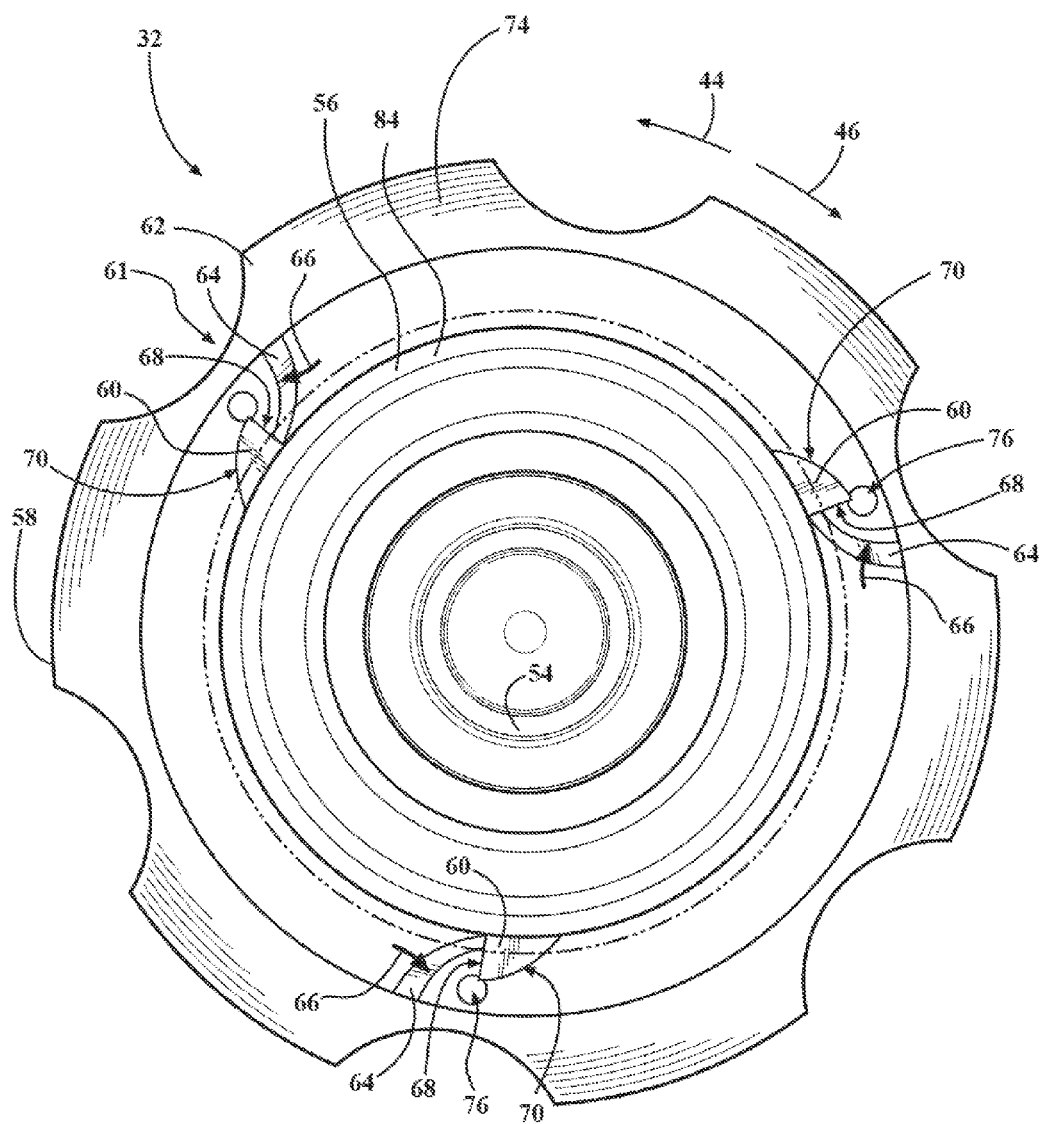
FIG. 5 is a schematic bottom view of the locking cap of FIG. 2 illustrating rotation in a first rotational direction.

The engagement portion 56 includes a tab 60, which extends radially outwardly. Likewise, the cover portion 58 includes a flexible arm 64, which extends radially inward at a first angle 66, best shown in FIG. 5. In the embodiment shown in FIGS. 4-6, the engagement portion 56 includes three tabs 60 and the cover portion 58 includes three flexible arms 64. It should be appreciated that any desired number of tabs 60 and arms 64 may be included in the locking cap 32. The tab 60 extends radially outwardly from the rim portion 84. The tabs 60 are substantially rigid and may have an arcuate, shark fin shape. More specifically, the tabs 60 may have a first wall 68, which extends generally perpendicularly from the rim portion 84. A second wall 70 may extend from the rim portion 84 in an arcuate direction to connect with the first wall 68. The flexible arm 64 is resilient. As illustrated in FIG. 5, each arm 64 engages the first wall 68 of the respective tab 60 when the annular cover portion 58 is rotated in the first rotational direction 44. This causes a corresponding rotation of the engagement portion 56 in the first rotational direction. Likewise, the flexibility of the arm 64 allows the arm 64 to be biased by the second wall 70 of the tab 60, and radially flexed away from the engagement portion 56, when the annular cover is rotated in the second rotational direction 46, as illustrated in FIG. 4. Therefore, the tab 60 causes the arm 64 to at least partially collapse. When the cover portion 58 is rotated in the second rotational direction 46, the arms 64 slide or otherwise pass over the corresponding tabs 60. This allows the annular cover portion 58 to rotate freely, relative to the annular engagement portion 56 such that the engagement threads 40 remain threadingly engaged with the threads 42, thus, preventing removal of the locking cap 32.

Figure 6:
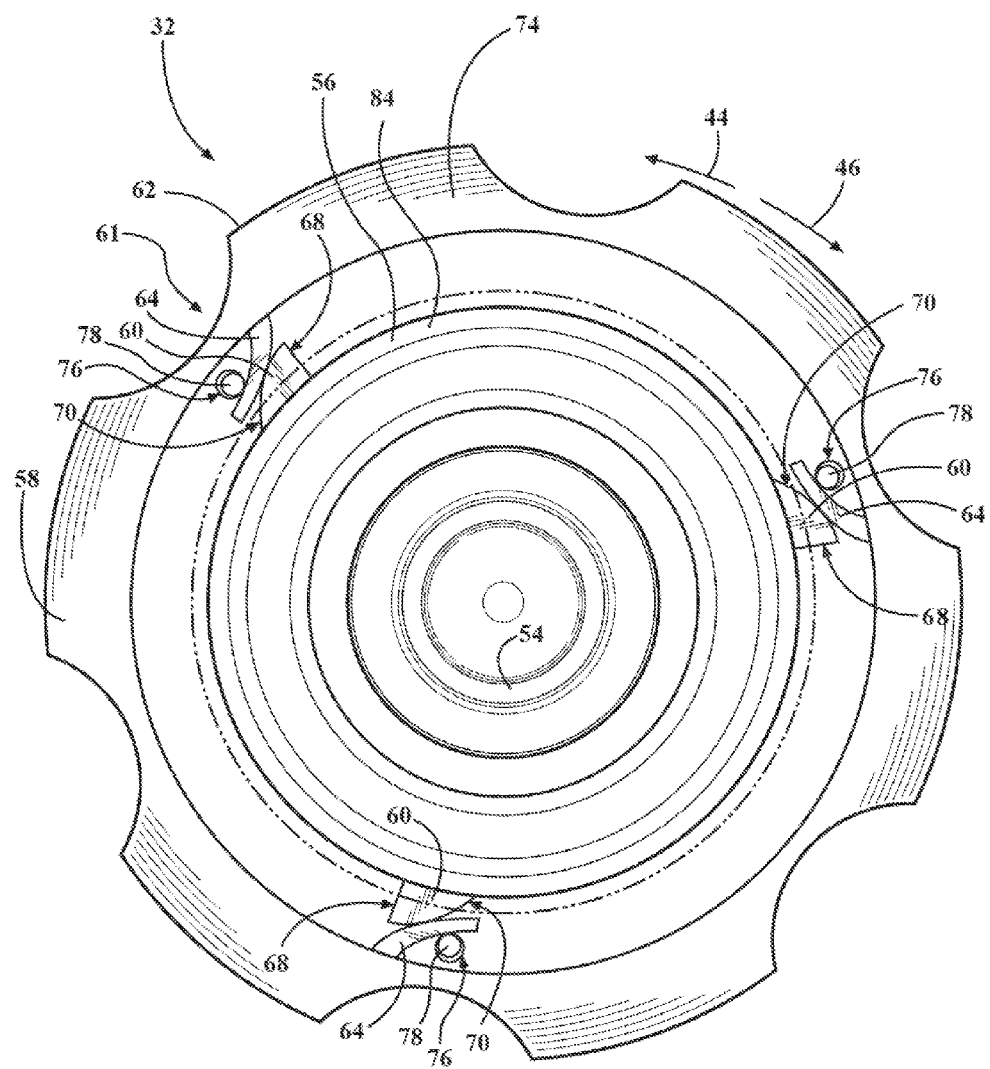
FIG. 6 is a schematic bottom view of the locking cap of FIG. 2, with pins of the release mechanism inserted therein, illustrating rotation of the entire cap in the second rotational direction, for removal from the installed position.
Figure 7:
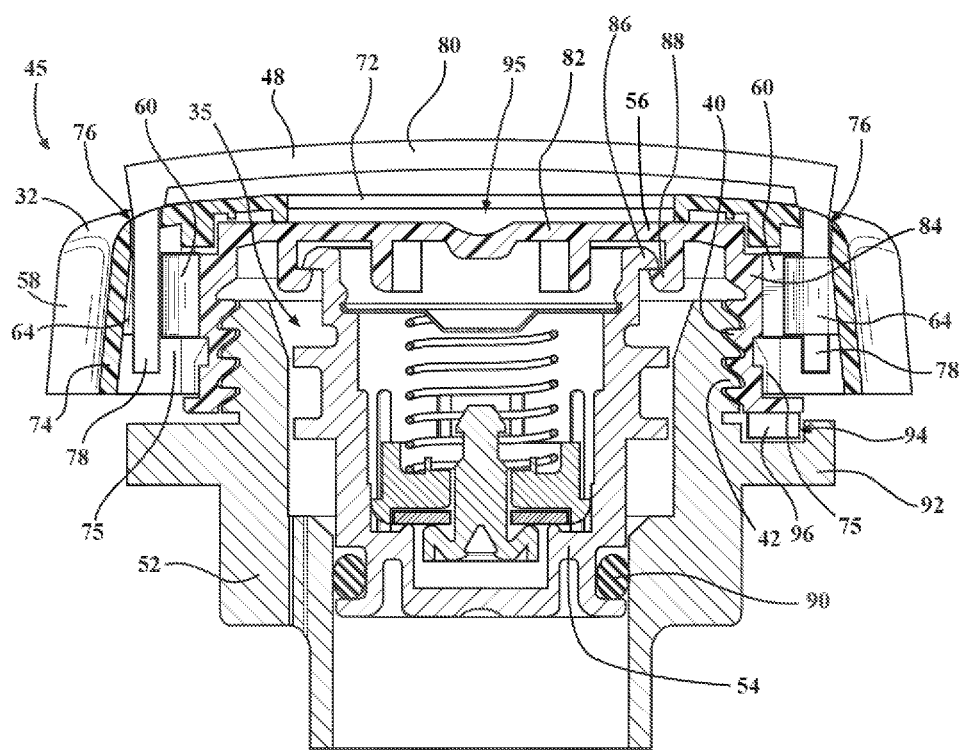
FIG. 7 is a schematic cross-sectional side view, taken along line 7-7 of FIG. 2, illustrating pins of the release mechanism inserted through the cover portion to facilitate removal of the locking cap from the installed position.

Referring to FIG. 7, the cover portion 58 includes a top portion 72, a skirt portion 74, and an outer retaining ring 75. The skirt portion 74 extends generally perpendicularly from the top portion 72 to radially surround the top portion 72. The skirt portion 74 extends generally perpendicularly from the cover portion 58 and radially surrounds the engagement portion 56. The outer retaining ring 75 extends radially inward from the skirt portion 74 such that the engagement portion 56 is axially retained between the outer retaining ring 75 and the top portion 72. The cover portion 58 defines at least one hole 76, proximate the arm 64. More specifically, the top portion 72 defines at least one hole 76, proximate the arm 64. However, in the embodiment shown herein, the cover portion 58 defines three holes 76. It should be appreciated that any desired number of holes 76 may be defined in the cover portion 58. Since the cover portion 58 rotates relative to the engagement portion 56 in the second rotational direction 46, the hole 76 is selectively alignable with any one of the tabs 60. In order to facilitate rotation of the engagement portion 56 in the second rotational direction 46, in response to rotation of the cover portion 58 in the second rotational direction 46, each hole 76 is configured to receive the pins 78 of the release mechanism 48 therethrough, as illustrated in FIG. 6. The release mechanism 48 and the locking cap 32 are configured to function together as a locking assembly 45 by allowing the engagement portion 56 to rotate in the second rotational direction 46, which can only happen when the release mechanism 48 is engaged with the holes 76 in the locking cap 32. When the pins 78 are inserted into the holes 76 defined in the cover portion 58, the arms 64 are trapped, or otherwise sandwiched, between the respective pins 78 and the tabs 60. As such, during rotation in the second rotational direction 46, the locking cap 32 can then be disengaged from the fill neck 52.

The release mechanism 48 includes the pins 78, which may correspond in number to the holes 76 defined in the cover portion 58. Referring to FIG. 3, the release mechanism 48 includes three pins 78, corresponding to three holes 76. A connecting portion 80 interconnects the pins 78 to one another, such that the pins 78 are axially alignable with the corresponding holes 76. For example, referring to FIGS. 2 and 3, the connecting portion 80 has a tri-blade shape. However, it should be appreciated that the connecting portion 80 may be any desired shape, so long as the pins 78 are alignable with the corresponding number of holes 76 in the cover portion 58. While the pins 78 and the corresponding holes 76 are shown as having a round cylindrical shape, the pins 78 and holes 76 may have any desired shape, such as a D-shape, triangular-shape, square-shape, hexagonal-shape, and the like. Additionally, the locking assembly 45 may also incorporate pins 78 and holes 76 having multiple shapes in the same locking assembly 45. By way of a non-limiting example, the locking assembly 45 may be configured such that one pin 78 and hole 76 combination is round shaped, the second is square shaped, and the third is D-shaped.

The engagement portion 56 includes an upper portion 82 and a rim portion 84. The upper portion 82 is covered by the cover portion 58. The rim portion 84 extends generally perpendicularly from the upper portion 82 and radially surrounds the fill neck 52. The rim portion 84 presents the engagement threads 40, which threadingly engage the threads 42 of the fill neck 52 when the locking cap 32 is installed to the fill neck 52.

The barrel portion 54 includes a radially extending first rim 86. The engagement portion 56 includes a radially extending second rim 88. The first rim 86 and the second rim 88 engage one another to axially retain the barrel portion 54 to the engagement portion 56. The engagement of the first rim 86 with the second rim 88 allows the engagement portion 56 to be rotated relative to the barrel portion 54 during threading of the engagement threads 40 with the threads 42, allowing the barrel portion 54 to only move generally axially down into the fill neck 52.

A seal 90 radially surrounds the annular barrel portion 54 to provide a seal to the cavity of the reservoir. The seal 90 is shown in FIG. 3 to be an o-ring seal 90. It should be appreciated that seals 90 having other shapes may also be used.

The fill neck 52 includes a radially extending ledge portion 92. The ledge portion 92 defines a recess 94. The engagement portion 56 includes a protrusion 96 which is configured to be received in the recess 94 of the ledge portion 92 when the engagement threads 40 are fully threadingly engaged with the threads 42 to prevent further tightening of the locking cap 32 to the fill neck 52 in the first rotational direction. Therefore, this can ensure proper alignment or orientation of the locking cap 32 with the fill neck 52. The cover portion 58 may also define an opening 95, which provides visibility of the upper portion 82 of the engagement portion 56 to the user of the vehicle 10, including any text or graphics imprinted thereon. Therefore, ensuing proper orientation of the engagement portion 56, would also mean that the orientation of the text or graphics imprinted on the upper portion 82 would also be controlled. Additionally, the protrusion 96, positioned in the recess 94, limits the ability of a user of the vehicle 10 to push against the cover portion 58 to attempt to axially bias the top portion 72 of the cover portion 58 to frictionally engage against the upper portion 82 of the engagement portion 56 and cause the engagement portion 56 to rotate in the second rotational direction 46, while simultaneously rotating the cover portion 58 in the second rotational direction 46. Therefore, the cover portion 58 may only be removed from the fill neck 52 with the aid of the release mechanism 48.

Figure 8:
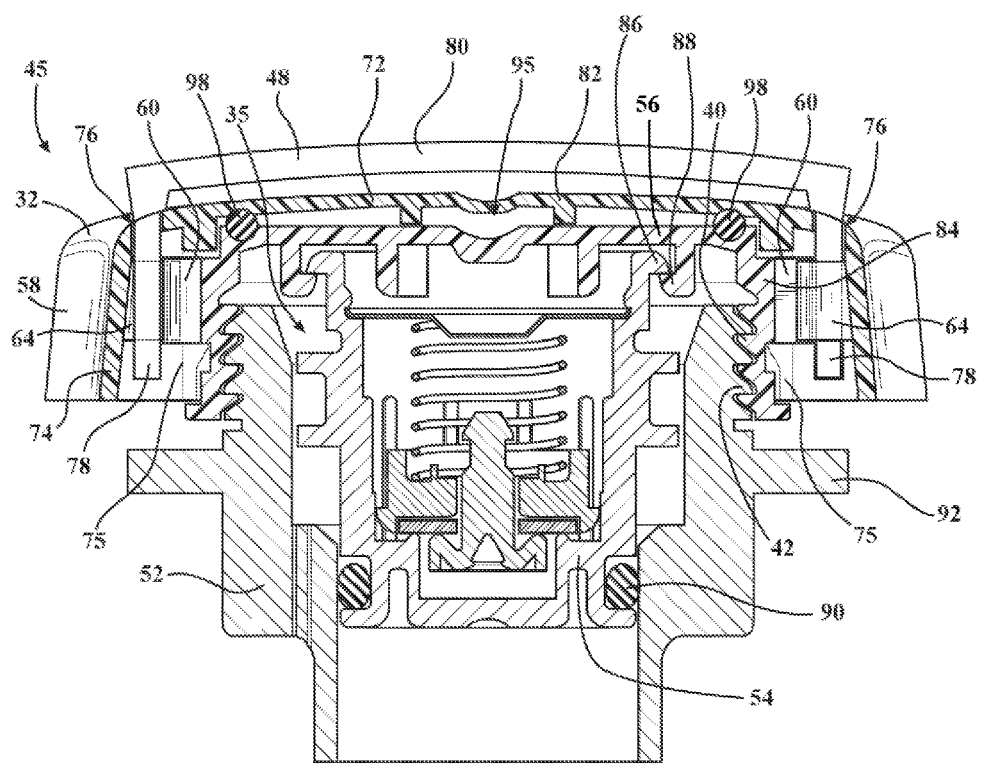
FIG. 8 is a schematic cross-sectional side view of another embodiment of the locking cap, taken along line 8-8 of FIG. 2, having bearings disposed between cover portion and the engagement portion.

Alternatively, referring to FIG. 8, bearings 98 may be disposed between the top portion 72 of the cover portion 58 and the upper portion 82 of the engagement portion 56. The bearings 98 allow the cover portion 58 to rotate relative to the engagement portion 56 in the second rotational direction 46 by preventing the user from pushing against the cover portion 58 to axially bias the top portion 72 of the cover portion 58 against the upper portion 82 of the engagement portion 56. More specifically, the bearings 98 prevent the top portion 72 from frictionally engaging the engagement portion 56 in the axial direction.

It should be appreciated that the locking assembly 45, including the locking cap 32 and release mechanism 48 are not limited to a cooling reservoir of a RESS module, but may also be used in any other location which requires limiting access. By way of a non-limiting example, the locking assembly 45 may be used with a fuel tank and the like.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

The invention claimed is:

1. A vehicle comprising:
a body component;
a rechargeable energy storage system (RESS);
an electric traction motor that is electrically connected to the RESS, and that is configured to provide an output torque for propelling the vehicle using electrical energy from the RESS;
a coolant reservoir configured to retain a fluid therein;
wherein the coolant reservoir includes a fill neck having threads;
wherein the coolant reservoir is in fluid communication with the RESS;
a cap threadingly engageable with the fill neck of the coolant reservoir, wherein the cap includes:
an annular barrel portion axially disposable in the fill neck of the coolant reservoir;
an annular engagement portion radially surrounding the annular barrel portion;
wherein the annular engagement portion presents engagement threads threadingly engageable with the threads of the fill neck;
an annular cover portion radially surrounding the annular engagement portion;
wherein the annular cover portion is configured to rotate in a first rotational direction and cause rotation of the engagement portion in the first rotational direction such that the engagement threads threadingly engage with the threads;
wherein the annular cover portion is configured to rotate relative to the annular engagement portion in a second rotational direction to cause rotation of the engagement portion in the second rotational direction such that the engagement threads remain threadingly engaged with the threads when a release mechanism is detached from the cap; and
wherein the annular cover portion is configured to rotate in the second rotational direction and cause rotation of the engagement portion in the second rotational direction such that the engagement threads threadingly disengage from the threads in response to attachment of the release mechanism to the locking cap.

2. The vehicle of claim 1, wherein the engagement portion includes a tab extending radially outwardly;
wherein the cover portion includes a flexible arm extending radially inward;
wherein the arm is configured to engage the tab when the annular cover portion is rotated in the first rotational direction to cause rotation of the engagement portion in the first rotational direction such that the engagement threads threadingly engage with the threads;
wherein the arm is configured to be biased by the tab and radially flexed away from the engagement portion when the annular cover is rotated in the second rotational direction such that the annular cover portion rotates relative to the annular engagement portion and the engagement threads remain threadingly engaged with the threads when the release mechanism is not attached to the cap; and
wherein the arm is configured to be engaged by the tab when the annular cover portion is rotated in the second rotational direction such that the engagement threads threadingly disengage from the threads when the release mechanism is attached to the cap.

3. The vehicle of claim 2, wherein the cover portion defines a hole proximate the arm and selectively alignable with the tab in response to rotation of the cap portion in the second rotational direction;
wherein the hole of the cover portion is configured to receive a pin of the release mechanism therethrough; and
wherein the pin is configured to be engaged by the tab when the pin is inserted in the cover portion.

4. The vehicle of claim 3, wherein the cover portion includes:
a top portion covering the engagement portion and defining the hole, proximate the arm;
a skirt portion extending generally perpendicularly from the cover portion and radially surrounding the engagement portion; and
an outer retaining ring extending radially inward from the skirt portion such that the engagement portion is axially retained between the outer retaining ring and the top portion.

5. The vehicle of claim 4, wherein the engagement portion includes:
an upper portion covered by the cover portion; and
a rim portion extending generally perpendicularly from the upper portion and configured to radially surround the fill neck;
wherein the rim portion presents the engagement threads which are threadingly engageable with the threads of the fill neck; and
wherein the tab extends radially outwardly from the rim portion.

6. The vehicle of claim 5, wherein the barrel portion includes a radially extending first rim and the engagement portion includes a radially extending second rim;
wherein the first rim and the second rim engage one another to axially retain the barrel portion to the engagement portion;
wherein the engagement of the first rim with the second rim allows the engagement mechanism to be rotated relative to the barrel portion.

7. The vehicle of claim 6, wherein the cap further includes a seal radially surrounding the barrel portion.

8. The vehicle of claim 5, wherein the threads are external threads and the engagement threads are internal threads.

9. The vehicle of claim 5, wherein the fill neck includes a radially extending ledge portion defining a recess; and
wherein the cover portion includes a protrusion configured for being received in the recess of the ledge portion when the engagement threads are threadingly engaged with the threads such that axial biasing of the top portion of the cover portion against the upper portion of the engagement portion is prevented.

10. A locking assembly for engaging and disengaging threads of a fill neck of a reservoir, the locking assembly comprising:
a release mechanism including a pin; and
a cap threadingly engageable with the fill neck of the coolant reservoir, wherein the cap includes:
an annular barrel portion axially disposable in the fill neck of the coolant reservoir;
an annular engagement portion radially surrounding the annular barrel portion;
wherein the annular engagement portion presents engagement threads threadingly engageable with the threads of the fill neck; and
an annular cover portion radially surrounding the annular engagement portion;

wherein the annular cover portion is configured to rotate in a first rotational direction and cause rotation of the engagement portion in the first rotational direction such that the engagement threads threadingly engage with the threads;

wherein the annular cover portion is configured to rotate relative to the annular engagement portion in a second rotational direction to cause rotation of the engagement portion in the second rotational direction such that the engagement threads remain threadingly engaged with the threads when the pin of the release mechanism is detached from the cap; and wherein the annular cover portion is configured to rotate in the second rotational direction and cause rotation of the engagement portion in the second rotational direction such that the engagement threads threadingly disengage from the threads in response to attachment of the pin of the release mechanism to the locking cap.

11. The locking assembly of claim 10, wherein the engagement portion includes a tab extending radially outwardly;

wherein the cover portion includes a flexible arm extending radially inwardly;

wherein the arm is configured to engage the tab when the annular cover portion is rotated in the first rotational direction to cause rotation of the engagement portion in the first rotational direction such that the engagement threads threadingly engage with the threads;

wherein the arm is configured to be biased by the tab and radially flexed away from the engagement portion when the annular cover is rotated in the second rotational direction such that the annular cover portion rotates relative to the annular engagement portion and the engagement threads remain threadingly engaged with the threads when the pin of the release mechanism is not attached to the cap; and wherein the arm is configured to be engaged by the tab when the annular cover portion is rotated in the second rotational direction such that the engagement threads threadingly disengage from the threads when the pin of the release mechanism is attached to the cap.

12. The locking assembly of claim 11, wherein the cover portion defines a hole proximate the arm and selectively alignable with the tab in response to rotation of the cap portion in the second rotational direction;

wherein the hole of the cover portion is configured to receive a pin of a release mechanism therethrough and wherein the pin is configured to be engaged by the tab when the pin is inserted in the cover portion.

13. The locking assembly of claim 12, wherein the cover portion includes:

a top portion covering the engagement portion and defining the hole, proximate the arm;

a skirt portion extending generally perpendicularly from the cover portion and radially surrounding the engagement portion; and an outer retaining ring extending radially inward from the skirt portion such that the engagement portion is axially retained between the outer retaining ring and the top portion.

14. The locking assembly of claim 13, wherein the engagement portion includes:

an upper portion covered by the cover portion; and a rim portion extending generally perpendicularly from the upper portion and configured to radially surround the fill neck;

wherein the rim portion presents the engagement threads which are threadingly engageable with the threads of the fill neck; and wherein the tab extends radially outwardly from the rim portion.

15. The locking assembly of claim 14, wherein the barrel portion includes a radially extending first rim and the engagement portion includes a radially extending second rim;

wherein the first rim and the second rim engage one another to axially retain the barrel portion to the engagement portion;

wherein the engagement of the first rim with the second rim allows the engagement mechanism to be rotated relative to the barrel portion.

16. The locking assembly of claim 15, wherein the cap further includes a seal radially surrounding the barrel portion.

17. The locking assembly of claim 14, wherein the threads are external threads and the engagement threads are internal threads.

18. The locking assembly of claim 14, wherein the fill neck includes a radially extending ledge portion;

wherein the ledge portion defines a recess; and wherein the cover portion includes a protrusion configured for being received in the recess of the ledge portion when the engagement threads are threadingly engaged with the threads to limit axial biasing of the top portion of the cover portion against the upper portion of the engagement portion.

* * * * *